United States Patent [19]

Smith

[11] Patent Number: 5,262,119
[45] Date of Patent: Nov. 16, 1993

[54] PLASTIC SYSTEM FOR INJECTION MOLDING AND EXTRUDING A HOLLOW TUBE FOR FORMING A PLASTIC CONTAINER BY BLOWING

[75] Inventor: Roger P. Smith, Napoleon, Ohio

[73] Assignee: Owens-Illinois Plastics Products Inc., Toledo, Ohio

[21] Appl. No.: 874,486

[22] Filed: Apr. 27, 1992

[51] Int. Cl.$^5$ .............................................. B29C 49/06
[52] U.S. Cl. ................................... 264/513; 264/515; 264/537; 264/539; 264/173; 264/328.8; 425/133.1; 425/525; 425/526; 425/532; 425/462
[58] Field of Search ................ 264/515, 328.8, 513, 264/539, 173, 537, 349, 328.18; 425/133.1, 462, 532, 525, 526, 130

[56] References Cited

U.S. PATENT DOCUMENTS

| | | |
|---|---|---|
| 3,051,453 | 8/1962 | Sluijters . |
| 3,090,994 | 5/1963 | Stenger ............................ 425/207 |
| 3,195,865 | 7/1965 | Harder . |
| 3,417,432 | 12/1968 | Albert et al. ..................... 425/204 |
| 3,477,097 | 11/1969 | Plymale ............................ 264/539 |
| 3,817,675 | 6/1974 | Maiocco ........................... 425/207 |
| 3,965,931 | 6/1976 | Skobel ............................. 264/176.1 |
| 4,135,870 | 1/1979 | Wallace et al. .................. 425/205 |
| 4,182,601 | 1/1980 | Hill .................................. 425/133.1 |
| 4,216,253 | 8/1980 | Bonnebat et al. ................ 425/205 |
| 4,305,902 | 12/1981 | Uhlig ............................... 425/532 |

FOREIGN PATENT DOCUMENTS

| | | | |
|---|---|---|---|
| 0278403 | 8/1988 | European Pat. Off. | ........... 264/513 |
| 57-93121 | 6/1982 | Japan | ................. 264/40.7 |

*Primary Examiner*—Jeffery Thurlow

[57] ABSTRACT

A plastic system for extruding injection molding and extruding a hollow tube from plastic containing heat sensitive material for thereafter forming into a plastic container by blowing including an extruder for melting the plastic and delivering it to an injection system for injecting the plastic into a manifold that delivers the plastic to the tubular cavities of an injection head including providing a static mixer adjacent each of the cavities. By such an arrangement, the plastic flow in each flow channel provides a uniform homogeneous plastic material such that streaks which may be caused by degraded plastic material or by different color material from a previous run are eliminated.

4 Claims, 4 Drawing Sheets

PLASTIC SYSTEM FOR INJECTION MOLDING AND EXTRUDING A HOLLOW TUBE FOR FORMING A PLASTIC CONTAINER BY BLOWING

This invention relates to plastic systems for directing plastic material to a plurality of openings which can be used to deliver the molten plastic material to injection mold cavities after which the material is extruded to form a tubular parison integral with the injection molded plastic that forms the finish. The parison is then capable of being blown to form a hollow plastic container.

BACKGROUND AND SUMMARY OF THE INVENTION

In the making of hollow plastic articles, it is common to deliver the plastic in the form of pellets to an extruder which in turn delivers the molten plastic material through one or more cavities. In one type of blow molding, the plastic material is first injected into a neck mold and further extrusion of the material forms a hollow parison integral with the injected neck and thereafter is blown.

Where the material includes colorant, it has been found that in some instances there is a degrading due to the presence of heat sensitive materials. In addition, different color material from a previous run is sometimes difficult to purge from the plastic system.

Accordingly, among the objectives of the present invention are to provide a plastic system which obviates the degradation; which system achieves the result at low cost and with a minimal change to the prior art system.

In accordance with the invention, the plastic system for injection molding and extruding a hollow tube from plastic containing heat sensitive material for thereafter forming into a plastic container by blowing comprising an extruder for melting the plastic and delivering it to an injection system for injecting the plastic into a manifold that delivers the plastic to the tubular cavities of an injection head comprising a static mixer adjacent each of the cavities. By such an arrangement, the plastic flow in each flow channel provides a uniform homogeneous plastic material such that streaks which may be caused by degraded plastic material and previous colors are eliminated.

DESCRIPTION

Figure 1:
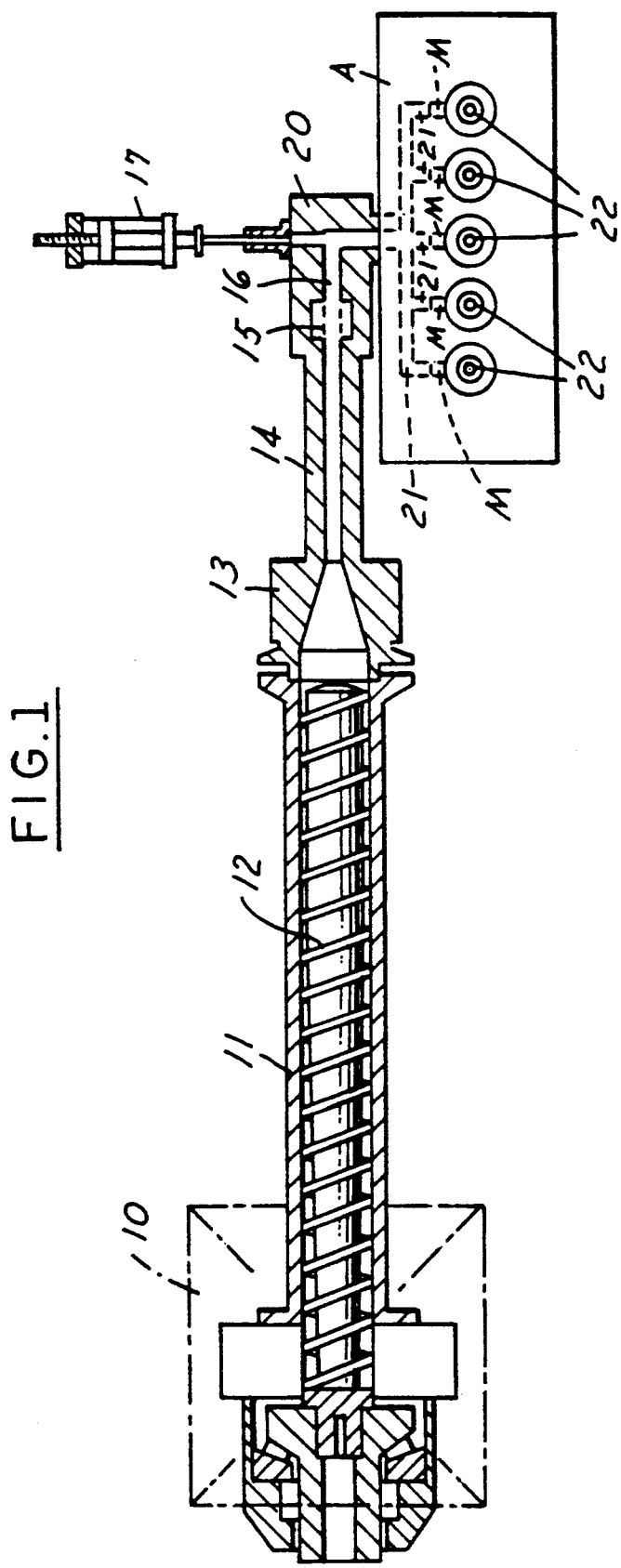
FIG. 1 is a diagrammatic view of a plastic delivery system embodying the invention.

Referring to FIG. 1, the plastic delivery system embodying the invention comprises a hopper 10 that delivers plastic pellets to an extruder barrel 11 that includes an extruder screw 12 that upon rotation mixes and melts the plastic pellets to deliver plastic through an adapter 13 and cross head 14 through a reciprocating valve 15 through a channel 16 to an accumulator 17 which in turn delivers the plastic under a controlled pressure to an injection head 20 that has a manifold supplying plastic to a plurality of channels 22 through branch channels 21. The channels 22 provide plastic in tubular form, for example, in the form of neck rings for forming the neck of a container. After injection molding the plastic in the cavities, the neck ring head is moved away from the injection head to extrude a tubular parison integral with the neck that has been injection molded so that the parison can thereafter be blown. The aforementioned construction is conventional prior art.

In accordance with the invention, a static mixer M is provided in each of the branch channels 21 and functions to disperse any material that has been degraded or is the wrong color back into the molten stream so that there is no change in color on the surface of the plastic material and in the resultant plastic container that is formed.

Figure 4:
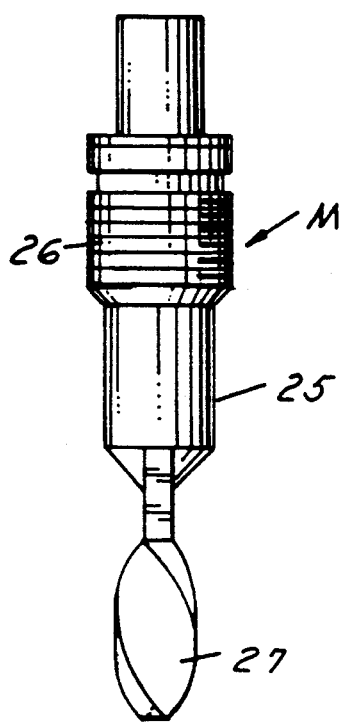
FIG. 4 is a front elevational view of a static mixer utilized in the system.
Figure 5:
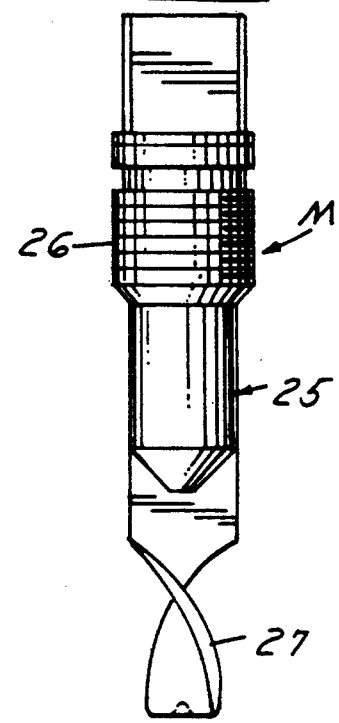
FIG. 5 is a side elevational view of a static mixer.

Referring to FIGS. 4 and 5, the static mixer M preferably comprises a body 25 that has a thread 26 that supports the body 25 in the manifold 21 and further includes a free end that is twisted from a flat piece of metal in a 180° twist in the center of the flat metal. This piece of twisted metal is then machined to a diameter to fit the flow channel and fastened in place to keep it from rotating relative to the flow channel. This may be also achieved by first forming the blade and having it extend into a slot in the plug portion, roll pinning the flat piece and silver soldering the static mixer to the flow plug.

An alternate construction method is to build a tapered mixer and fit it into a tapered flow channel then silver soldering it in place.

Figure 6:
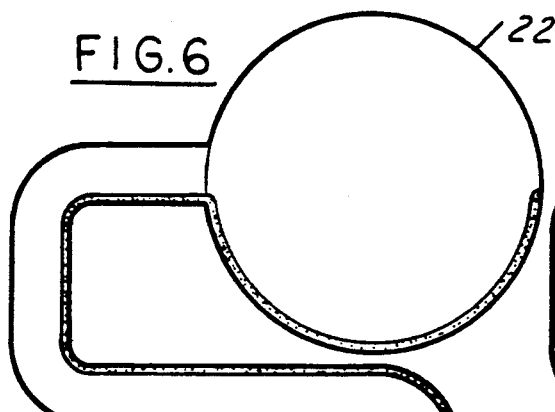
FIG. 6 is a schematic of a conventional prior art system.

The function of the plastic system embodying the invention can be readily understood by the schematic of the prior art system as shown in FIG. 6 wherein the flow from the channel to the individual channels is laminar flow so that the portion traveling along the flow channel wall flows at a lesser velocity tend to become degraded as represented schematically by the portion L. This flows along the side wall of the tubular sleeve that forms the parison and produces an uneven color in the resultant article.

Figure 7:
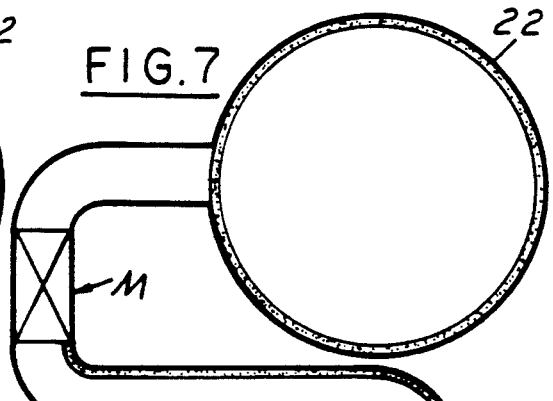
FIG. 7 is a schematic of a portion of the system embodying the invention.

This may be contrasted to the plastic system embodying the invention as shown in FIG. 7 wherein the static mixer M functions to provide a uniform homogenous color causing the plastic material to become mixed and obviating any discontinuity in color.

Figure 2:
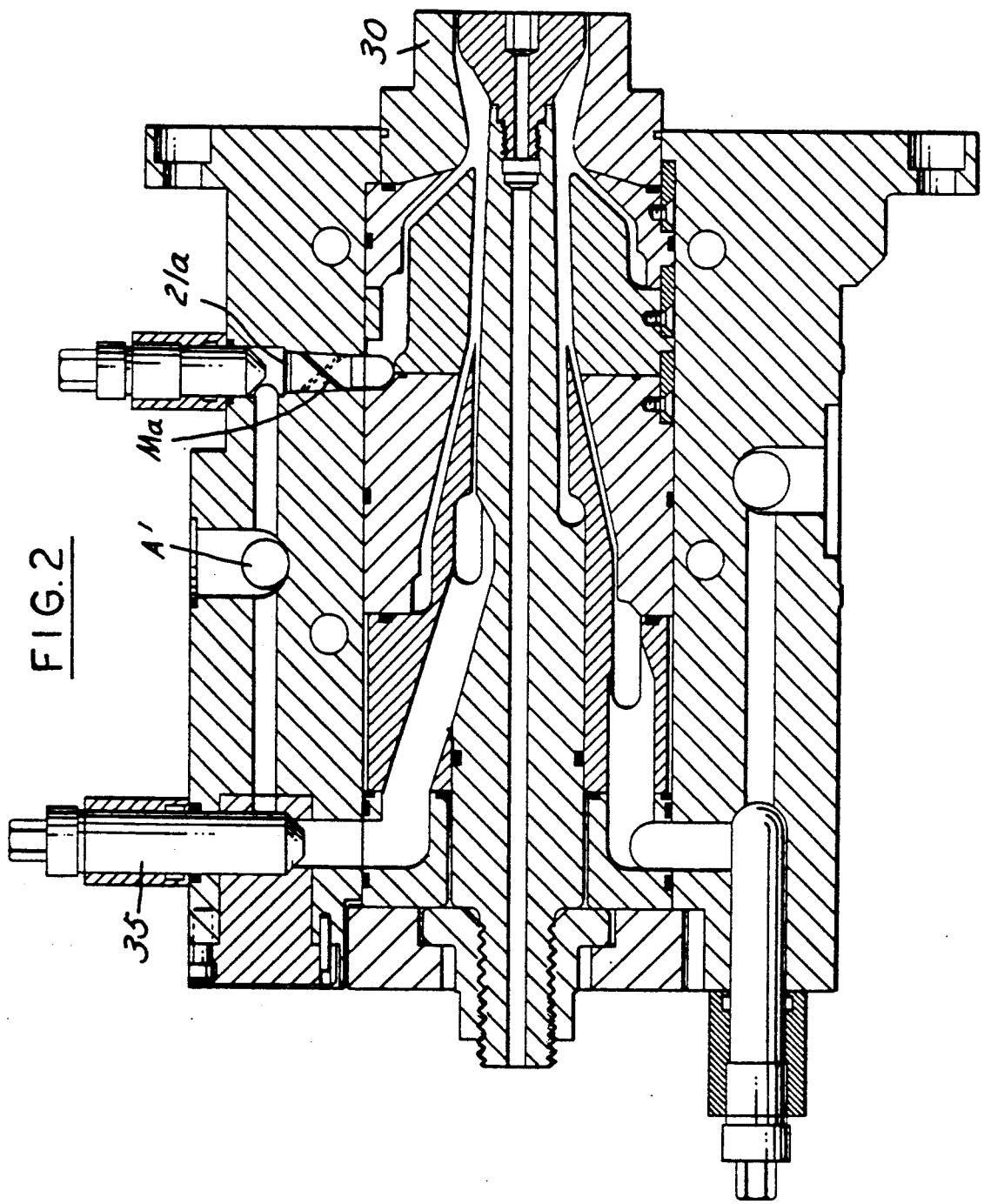
FIG. 2 is a sectional view on a greatly enlarged scale of a portion of an apparatus used in the system shown in FIG. 1.

In the form shown in FIG. 2, the apparatus for the system includes a manifold A', a separate mixer $M_a$ in a channel $21a$ supplying plastic to the die head 30.

Figure 3:
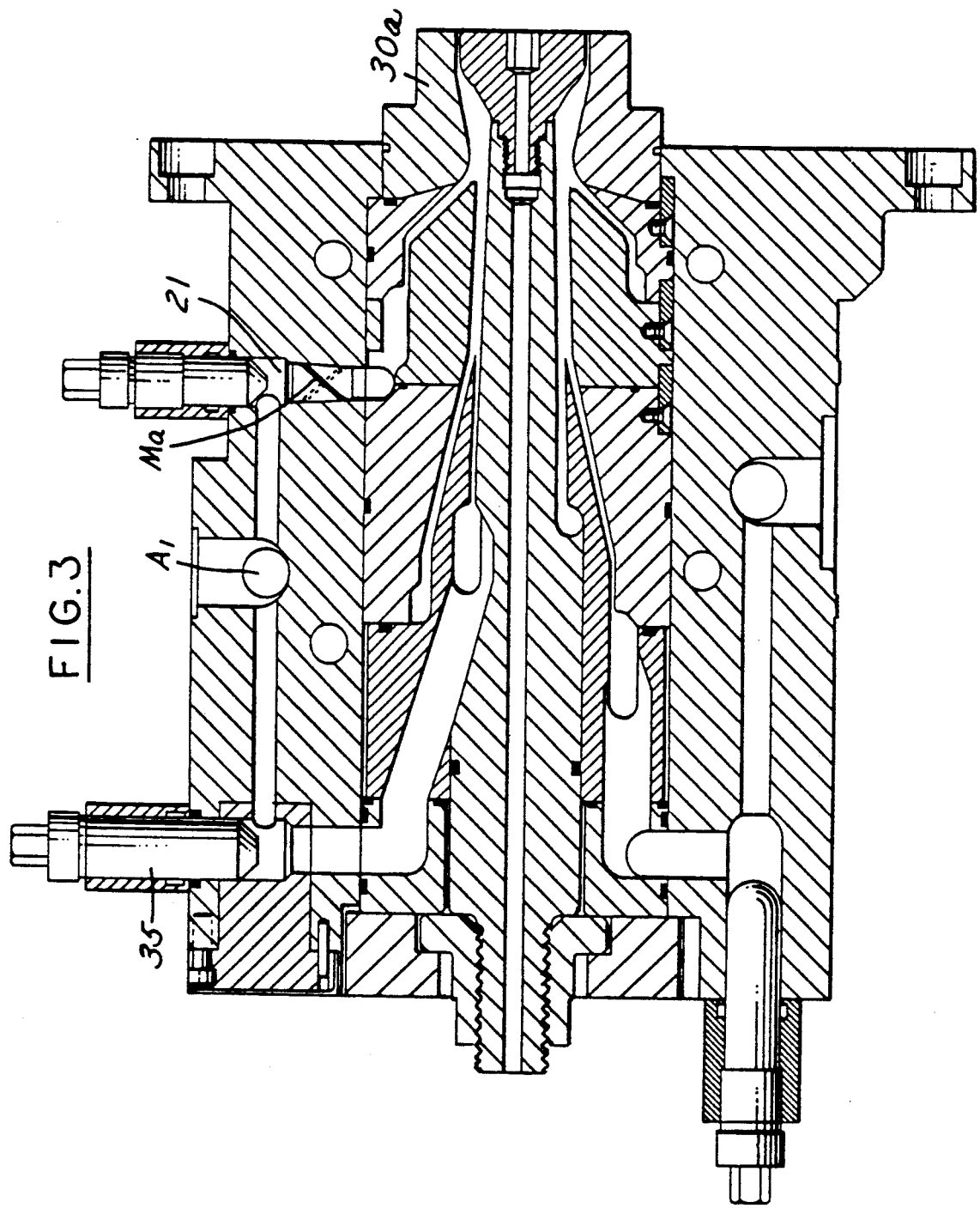
FIG. 3 is a sectional view of a modified form of apparatus.

The form shown in FIG. 3 is for coextrusion of different types of plastic wherein a valve 35 can be opened to supply an inner layer to the die head $30a$ such that only the plastic in the channel 21 for the outer layer has a mixer $M_a$ therein.

It can thus be seen that there has been provided a plastic system which obviates the degradation; which system achieves the result at low cost and with a minimal change to the prior art system.

I claim:

1. In a plastic system for injection molding and extruding a hollow tube for forming a plastic container by blowing comprising an extruder for melting the plastic and delivering it to a system for injecting the plastic into a manifold having flow channels that deliver the plastic to mold cavities, the improvement comprising a static mixer in each of said channels which defines a helical path adjacent each of the cavities, such that the plastic flow in each said flow channel provides a uniform homogenous plastic material such that streaks which may be caused by degraded plastic material are eliminated.

2. The apparatus set forth in claim 7 wherein each said static mixer comprises a portion defining said helical path.

3. The apparatus set forth in claim 2 wherein each said static mixer extends for 180° along the helical path.

4. In the method of forming a plastic system for injection molding and extruding a hollow tube for forming a plastic container by blowing comprising an extruder for melting the plastic and delivering it to a system for injecting the plastic into a manifold having flow channels that deliver the plastic to mold cavities, the improvement comprising providing a static mixer in each of said flow channels defining a helical path adjacent each of the cavities, such that plastic flow in each flow channel comprises a uniform homogeneous plastic material such that streaks which may be caused by degraded plastic material are eliminated.

* * * * *